United States Patent
Lenges et al.

(10) Patent No.: US 7,608,303 B2
(45) Date of Patent: *Oct. 27, 2009

(54) DURABLE COATING COMPOSITIONS CONTAINING ASPARTIC AMINE COMPOUNDS

(75) Inventors: Christian Peter Lenges, Wilmington, DE (US); Robert John Barsotti, Franklinville, NJ (US); Patrick Henry Corcoran, Cherry Hill, NJ (US); Laura Ann Lewin, Greenville, DE (US); Stefan Reinartz, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 674 days.

This patent is subject to a terminal disclaimer.

(21) Appl. No.: 11/303,080

(22) Filed: Dec. 14, 2005

(65) Prior Publication Data

US 2006/0141161 A1 Jun. 29, 2006

Related U.S. Application Data

(60) Provisional application No. 60/636,228, filed on Dec. 15, 2004.

(51) Int. Cl.
*B05D 3/08* (2006.01)
*C08G 18/08* (2006.01)

(52) U.S. Cl. ............ 427/407.1; 427/372.2; 427/402; 524/589

(58) Field of Classification Search ............ 427/407.1
See application file for complete search history.

(56) References Cited

U.S. PATENT DOCUMENTS

| | | | |
|---|---|---|---|
| 4,591,533 A | 5/1986 | Antonelli et al. | |
| 5,126,170 A | 6/1992 | Zwiener et al. | |
| 5,236,741 A | 8/1993 | Zwiener et al. | |
| 5,243,012 A | 9/1993 | Wicks et al. | |
| 5,412,056 A | 5/1995 | Zwiener et al. | |
| 5,516,873 A | 5/1996 | Hicks et al. | |
| 5,580,945 A | 12/1996 | Wade et al. | |
| 5,763,528 A | 6/1998 | Barsotti et al. | |
| 6,005,062 A | 12/1999 | Hansen et al. | |
| 6,221,494 B1 | 4/2001 | Barsotti et al. | |
| 6,630,537 B1 * | 10/2003 | Baumgart et al. | 525/123 |
| 7,166,748 B2 | 1/2007 | Lenges et al. | |
| 7,214,828 B2 | 5/2007 | Lenges et al. | |
| 7,276,288 B2 | 10/2007 | Corcoran et al. | |
| 7,427,647 B2 | 9/2008 | Reinartz et al. | |
| 7,449,242 B2 | 11/2008 | Lenges et al. | |
| 2004/0001009 A1 | 1/2004 | Winings et al. | |
| 2005/0159636 A1 | 7/2005 | Tarone et al. | |
| 2006/0155053 A1 | 7/2006 | Lenges et al. | |
| 2006/0155054 A1 | 7/2006 | Lenges et al. | |
| 2006/0155056 A1 | 7/2006 | Lenges et al. | |
| 2006/0228485 A1 | 10/2006 | Lenges et al. | |

FOREIGN PATENT DOCUMENTS

EP 0 939 091 A1 9/1999

* cited by examiner

*Primary Examiner*—Michael Barr
*Assistant Examiner*—Ryan Schiro

(57) ABSTRACT

A coating composition comprising a binder of
a. polyisocyanate crosslinking agent;
b. an isocyanate-reactive component having at least one compound having the following formula:

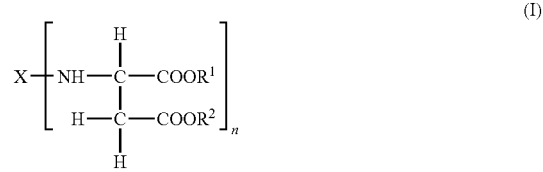

(I)

wherein n on average is 1.7 to 2 and X stands for a cycloaliphatic norbornane derivative containing methylene amine groups of formula (II)

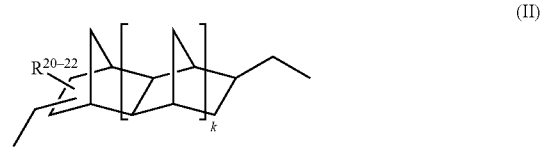

(II)

either alone, as combinations of these, and/or as mixtures of isomers of these, in which the exact point of attachment and orientation of —$CH_2$— group to the NH group and $R^{20}$—$R^{22}$ to the norbornane scaffold can vary and mixtures of compounds and isomers are commonly utilized by this invention; two component compositions and articles coated with the novel composition also are part of the invention.

2 Claims, No Drawings

DURABLE COATING COMPOSITIONS CONTAINING ASPARTIC AMINE COMPOUNDS

CROSS-REFERENCE TO RELATED APPLICATION

This application claims the benefit of U.S. Provisional Application Ser. No. 60/636,228 filed on Dec. 15, 2004 which are hereby incorporated by references in its entirely.

FIELD OF THE INVENTION

This invention is directed to coating compositions, in particular, to coating compositions that are useful as exterior clear finishes for automobiles and trucks.

BACKGROUND OF THE INVENTION

The finishing system of choice presently being used on the exterior of automobiles and trucks comprises a clear coating applied over pigmented base coating that is applied over a primer coating. The clear coating provides protection, in particular, protection from weathering, to the pigmented base coating and improves the appearance of the overall finish, in particular, provides improved gloss and distinctness of image. The primer coating provides adhesion to the substrate and, in particular, provides resistance to stone chipping. When used in refinishing of automobile and truck bodies, the clear coating and primer coating are required to have an acceptable "pot life" and reasonably short cure time period to allow for application of a subsequent coat and in the case of a clear coating to allow for further processing or handling of the vehicle without damaging the finish. The term "pot life" means the period of time after a coating is mixed with a crosslinking agent, with or without a catalyst, in which the composition remains at a sprayable viscosity.

The following U.S. Patents: U.S. Pat. Nos. 5,516,873, 5,126,170, 5,243,012, 5,236,741, 5,412,056, 5,580,945, and 6,005,062, show a variety of coating composition that contain polyaspartic acid derivatives but these compositions do not have a property balance of acceptable pot life and rapid curing time to form a sufficiently hard finish to allow additional handling and processing of a coated vehicle or work piece after the coating composition has been applied.

To improve the rate of curing EP 0939091 uses reactive amine compounds. A typical example of such an amine is the reaction product of 4,4'-methylenebiscyclohexanamine with two moles of diethyl maleate. However, coating compositions formulated with these reactive amines do not have the desired balance of acceptable pot-life and the desired cure rate after application to an object while maintaining or improving on the desired properties of the resulting finish. In an effort to improve pot life, solvents and catalysts have been used but solvents have a deleterious effect on VOC (volatile organic content) emissions, which is undesirable and catalysts can result in deterioration of film properties, such as durability. It is, therefore, desired to find a class of amine functional compounds for the reaction with isocyanates, which form coating compositions that overcome these problems and form acceptable finishes for automotive and truck substrates.

The novel composition of this invention utilizes amine functional compounds that form low VOC coating compositions having an optimum balance of pot life and curing time and form finishes, in particular, clear and primer finishes useful for automobiles and trucks. The clear coatings have excellent properties, such as hardness, gloss, low color, durability, weatherability, and in particular resistance to UV (ultraviolet light) degradation, particularly when reinforced with ultraviolet light absorbers and screeners and hindered amine light stabilizers. The primer coatings exhibit excellent adhesion to metal substrates, in particular, aluminum and steel substrates, and provide for excellent stone chip resistance.

SUMMARY OF THE INVENTION

A coating composition comprising a binder of
a. polyisocyanate crosslinking agent;
b. an isocyanate-reactive component having at least one compound having the following formula:

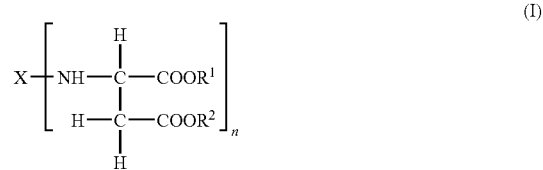

wherein n on average is 1.7 to 2 and X stands for a cycloaliphatic norbornane derivative containing methylene amine groups of formula (II):

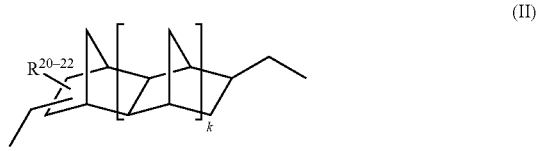

either alone, as combinations of these, and/or as mixtures of isomers of these, in which the exact point of attachment and orientation of —$CH_2$— group to the —NH— group and $R^{20}$—$R^{22}$ to the norbornane scaffold can vary and mixtures of compounds and isomers are commonly utilized by this invention;

wherein
k=0, 1 or 2 and the bridging $CH_2$ group may be on the same or opposite side with respect the first bridging $CH_2$ group, wherein
$R^{20}$, $R^{21}$, $R^{22}$ can be the same or different and are each independently H, a $C_1$ to $C_{20}$ alkyl group, a $C_1$ to $C_{20}$ alkyl group substituted with a hydroxyl group, a $C_1$ to $C_{18}$ perfluoroalkyl group, a phenyl group, a $C_6$ to $C_{20}$ aryl group substituted with a $C_1$ to $C_{12}$ alkyl group, a $C_6$ to $C_{20}$ aryl group substituted with a hydroxyl group, a $C(O)OR^{29}$ group (with $R^{29}$ selected to be a $C_1$ to $C_{20}$ linear or branched or cyclic alkyl group or a $C_6$ to $C_{20}$ aryl group), with the proviso that $R^{20}$, $R^{21}$ and $R^{22}$ can not all be H;

wherein
$R^1$ and $R^2$ are the same or different organic groups that are inert to isocyanate groups, preferably ethyl, propyl, butyl, secondary-butyl, cyclohexyl, $C_6$-$C_{18}$ linear or branched alkyl groups.

Two component compositions formulated with the above constituents and substrates, such as, automotive and truck bodies and parts coated with the novel composition are also part of this invention.

DETAILED DESCRIPTION OF THE INVENTION

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

All patents, patent applications and publications referred to herein are incorporated by reference in their entirety.

A typical auto or truck body is produced from a steel sheet or a plastic or a composite substrate. For example, the fenders may be of plastic or a composite and the main portion of the body of steel. If steel is used, it is first treated with an inorganic rust-proofing compound, such as, zinc or iron phosphate and then a primer coating is applied generally by electrodeposition. Typically, these electrodeposition primers are epoxy-modified resins crosslinked with a polyisocyanate and are applied by a cathodic electrodeposition process. Optionally, a primer can be applied over the electrodeposited primer, usually by spraying, to provide better appearance of a base coating or a mono coating applied over the primer and to improve the adhesion of such coatings to the primer or both of the above. A mono coating of a pigmented coating composition then can be applied but preferably, a pigmented base coating with a clear top coating is applied to form a clear coat/color coat finish on the truck or automobile body or auto or truck part. Usually, after application, each of the coatings may be cured at ambient temperature or by baking at an elevated temperature. It is generally known that a clear top coating can be applied over the base coating and both coatings cured together at an elevated temperature.

When refinishing automobile and truck bodies, the original OEM topcoat is usually sanded and a primer or sealer coat applied and then a mono coat or a basecoat/clear coat is applied. These coatings are usually cured at ambient temperatures or at slightly elevated temperatures, such as, 40 to 100° C.

A "clear coating composition" for automotive use is a composition that forms a transparent finish upon curing and typically has a DOI (distinctness of image) of more than 70 and a 20° gloss of more than 70. These clear coatings provide a glossy in depth appearance to the finish on the automobile or truck and therefore, are required to have good gloss and distinctness of image. Also, the clear finish also provides a protective finish that is durable and resistant to scratching, marring and chipping and also provides resistance to weathering, in particular to U.V. degradation and photo-oxidation.

A "matte clear coating composition" can also be used, for example for the interior of an automobile or truck. These matte finishes have a substantially lower gloss, for example, a 20° gloss of 20 or less and very low DOI.

Typical "primer compositions" provide adhesion to a substrate and for the novel compositions of this invention provide excellent adhesion to bare metal substrates, such as, steel and aluminum, and to treated metal substrates, such as galvanized steel, and provide a surface to which the topcoat, such as, a pigmented mono coat or the basecoat of a base coat clear coat finish.

The term "binder" as used herein refers to the film forming constituents of the composition that include the isocyanate reactive component, i.e., having functional groups that are reactive with isocyanates and comprising active hydrogen, and optional polymeric and/or oligomeric components, polyisocyanate crosslinking agents and optional reactive diluents, such as, ketimines and aldimines and optional acrylic non-aqueous dispersions. Solvents, pigments, catalysts, rheology modifiers, antioxidants, U.V. absorbers, hindered amine light stabilizers, antioxidants, in particular disubstituted phenolic compounds, hydroperoxide decomposers, leveling agents, antifoaming agents, anti-cratering agents, adhesion promoting agents are not included in the term.

Molecular weight (both number and weight average) is determined by gel permeation chromatography utilizing a high performance liquid chromatograph supplied by Hewlett-Packard, Palo Alto, Calif. and unless otherwise stated the liquid phase used was tetrahydrofuran and the standard was polymethylmethacrylate or polystyrene.

"Tg" (glass transition temperature) is in ° C. and determined by Differential Scanning Calorimetry or calculated according to the Fox Equation.

Typically the binder of the novel composition comprises 20 to 80% by weight, based on the weight of the binder, of the isocyanate reactive component or aspartic acid derivative and 20 to 80% by weight, based on the weight of the binder, of a polyisocyanate crosslinking agent. The stochiometric ratio of isocyanate functionality to isocyanate reactive component is 0.5 to 3.0, preferably, 0.8 to 2.0 and most preferably, 1.0 to 1.5. Optionally, the binder can contain up to 75% by weight, preferably, 5 to 60% by weight, and most preferably, 5 to 30% by weight, based on the weight of the binder, of a polymeric or oligomeric component or both wherein the component contains groups that are reactive with the polyisocyanate crosslinking agent. One preferred binder composition contains 25 to 50%, by weight of the isocyanate reactive component, 5 to 30% by weight of the polymeric or oligomeric component or both and 20 to 70% by weight of a polyisocyanate, wherein the sum of all of the components of the binder is 100%. Another preferred binder composition contains the isocyanate reactive component as the sole nucleophilic component that is reactive with the polyisocyanate.

Particular advantages of the novel coating composition of this invention is that it provides a protective clear finish that has an excellent balance between pot life and cure characteristics once applied to the object. Also, the resulting finish has good gloss and distinctness of image that provides an excellent appearance. The finish hardens in a reasonably short time after application and has excellent weatherability, in particular resistance to U.V. degradation and photo-oxidation when properly reinforced with the appropriate additives. When the novel composition is used to refinish automobiles and trucks, it has excellent adhesion to metal substrates and cures to a tack free state in a relatively short period of time under ambient temperatures or under slightly elevated drying temperatures, for example, 40 to 100° C., that allows a coated vehicle to be moved or further processed without damage to the finish.

The novel composition of this invention can contain pigments and is useful as a pigmented mono-coat topcoat, as a pigmented base coat of a base coat/clear coat finish or as a primer or primer surfacer, which cures in a relatively short period of time to allow for subsequent application of topcoats, basecoat/clear coats or monocoats. The novel composition can also be used for OEM (original equipment manufacture) of automobiles, trucks and parts thereof.

The novel composition typically is solvent based and has a solids content of film forming binder of 20 to 90% by weight, preferably, 40 to 80% by weight. It may be possible to formulate a 100% solids composition with the use of reactive diluents or when applied at high viscosities by, for example, using airless spray equipment or when used as a putty.

An aqueous liquid carrier, which typically is water but may contain other liquids, may be used in place of the solvent. Before application a sufficient amount of liquid usually is added, for example, water or solvents, to reduce the composition to a spray viscosity. In the event the novel coating composition is an aqueous based composition, the composition typically has a pH of 6.0 to 10.0 and preferably, 7.5 to 8.5.

The isocyanate reactive component of the novel composition is an aspartic acid derivative and has the formula

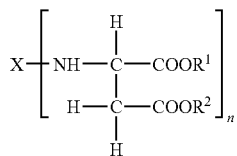

(I)

wherein n on average is 1.7 to 2 and X stands for a cycloaliphatic norbornane derivative containing methylene amine groups of formula (II):

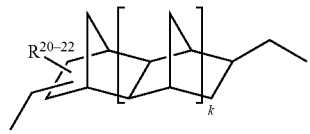

(II)

either alone, as combinations of these, and/or as mixtures of isomers of these, in which the exact point of attachment and orientation of —CH$_2$— group to the —NH— group and R$^{20}$—R$^{22}$ to the norbornane scaffold can vary and mixtures of compounds and isomers are commonly utilized by this invention;

wherein
k=0, 1 or 2 and the bridging CH$_2$ group may be on the same or opposite side with respect the first bridging CH$_2$ group, wherein
R$^{20}$, R$^{21}$, R$^{22}$ can be the same or different and are each independently H, a C$_1$ to C$_{20}$ alkyl group, a C$_1$ to C$_{20}$ alkyl group substituted with a hydroxyl group, a C$_1$ to C$_{18}$ perfluoroalkyl group, a phenyl group, a C$_6$ to C$_{20}$ aryl group substituted with a C$_1$ to C$_{12}$ alkyl group, a C$_6$ to C$_{20}$ aryl group substituted with a hydroxyl group, a C(O)OR$^{29}$ group (with R$^{29}$ selected to be a C$_1$ to C$_{20}$ linear or branched or cyclic alkyl group or a C$_6$ to C$_{20}$ aryl group), with the proviso that R$^{20}$, R$^{21}$ and R$^{22}$ can not all be H;

wherein
R1 and R2 are the same or different organic groups that are inert to isocyanate groups, preferably ethyl, propyl, butyl, secondary-butyl, cyclohexyl, C6-C18 linear or branched alkyl groups.

Preferred norbornane methylene amine derivatives used to form the isocyanate reactive component are, for example, structures (III-X):

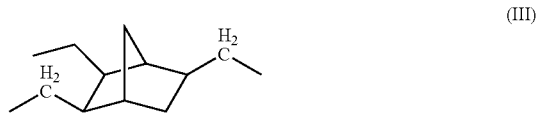

(III)

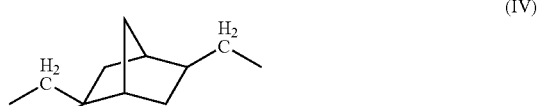

(IV)

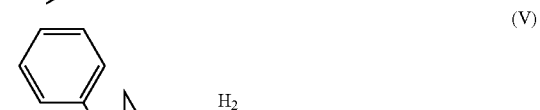

(V)

(VI)

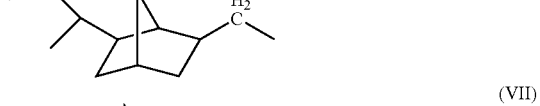

(VII)

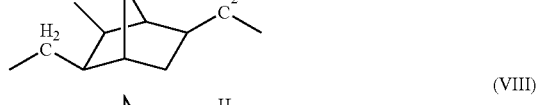

(VIII)

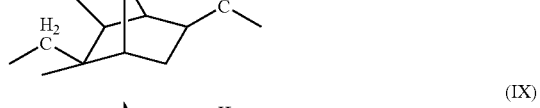

(IX)

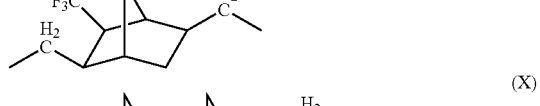

(X)

as a single isomer or as a mixture of isomers, or as a mixture of different compounds of structure (II).

These norbornane amine derivatives use cycloaliphatic diamines as starting materials. These cycloaliphatic diamines are of the same structures (III-X) as shown above except that an NH$_2$ group is connected to the CH$_2$ group of the structure. These norbornane amine derivatives may contain, for example, a methyleneamine substituted norbornane (bicyclo [2.2.1]heptane) fragment. This amine fragment can be prepared in a hydrogenation process as described in filed U.S. patent application Ser. No. 10/760,778 filed Jan. 19, 2004. The starting material for this methylene amine compound is a norbornane nitrile derivative which can be prepared as described in filed U.S. patent application Ser. No. 10/760,779, filed Jan. 19, 2004. The entire disclosures of these applications are incorporated herein by reference.

The isocyanate reactive compounds of this invention are prepared in a reaction of the corresponding amine (compounds III-X) with a maleic or fumaric acid ester of the general formula (XI)

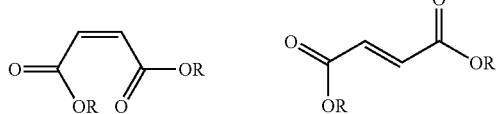
(XI)

with R equal to $R^1$ and/or $R^2$ as described above.

For the synthesis of the isocyanate reactive components of this invention useful maleic or fumaric acid esters are, for example, dimethylmaleate, diethylmaleate, di-n-butylmaleate, di-sec-butylmaleate, di-cyclohexyl-maleate and the corresponding fumaric acid esters. The preparation of the isocyanate reactive components of this invention from the indicated starting materials may be carried out in a temperature range of 0 to 100° C. The mole-ratios of starting materials used of these reactions are such that for each primary amine functional group at least one and preferentially one equivalent of maleic or fumaric acid ester is used. Optionally, starting materials, which are used in excess in this reaction, can be separated from the product mixture using methods known to those skilled in the art, such as distillation or chromatography. The reaction can be carried out using the starting materials directly or in the presence of a solvent such as methanol, ethanol, propanol, tetrahydrofuran, dioxan, toluene, xylenes, acetonitrile or mixtures of such solvents.

The following are preferred isocyanate reactive compounds of this invention (XII-XXV):

(XII)
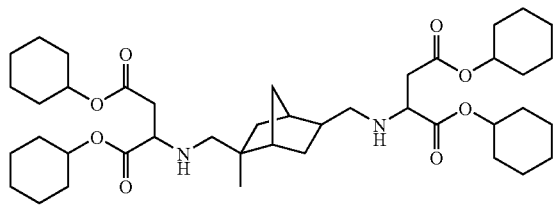

(XIII)
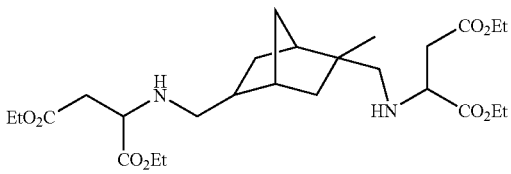

(XIV)
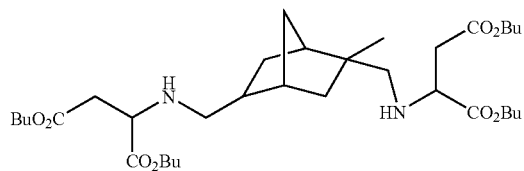

(XV)
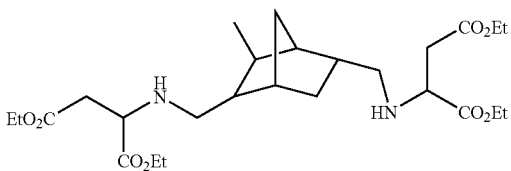

(XVI)
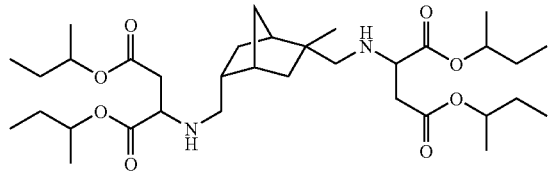

(XVII)
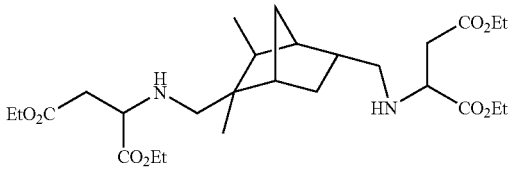

(XVIII)
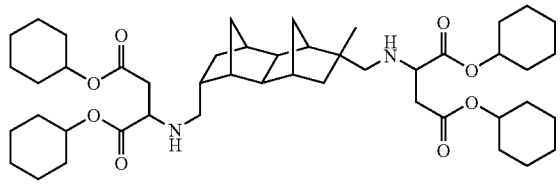

(XIX)
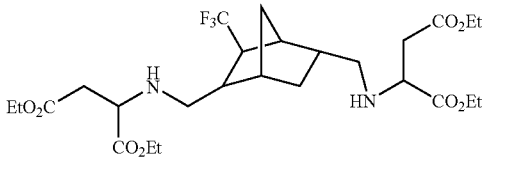

(XX)
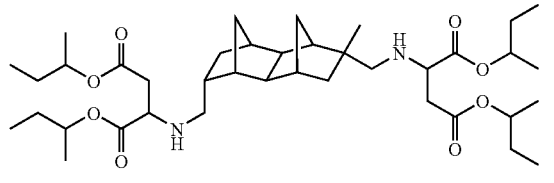

(XXI)
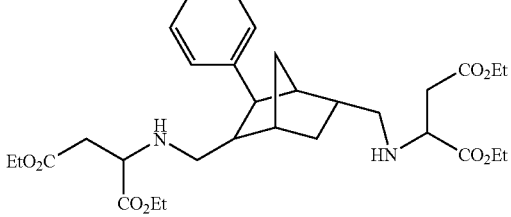

-continued

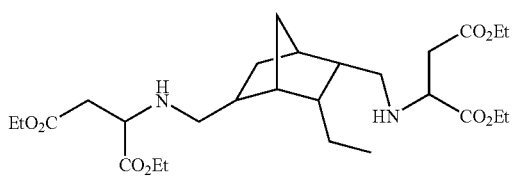
(XXII)

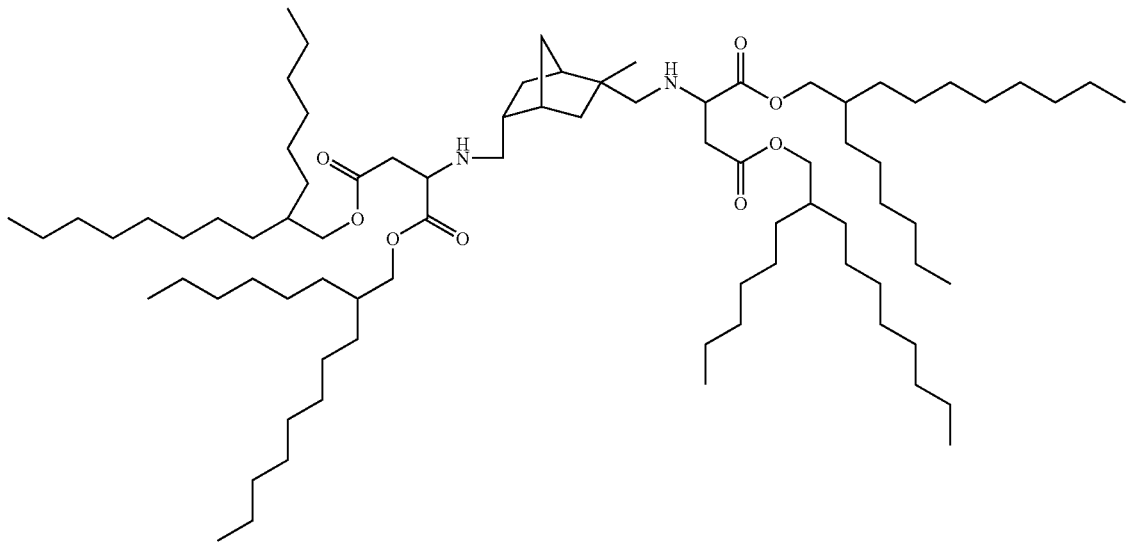
(XXIII)

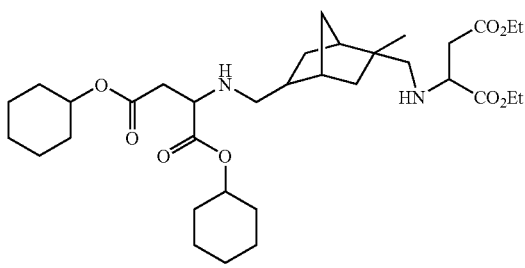
(XXIV)

(XXV)

and isomers thereof.

The novel coating composition can contain optional polymeric components. These components have groups that are reactive with isocyanate and can be used in an amount of up to 75% by weight, preferably, 1 to 60% by weight, based on the weight of the binder. One preferred polymeric component is an acrylic polymer. Typically useful acrylic polymers have a number average molecular weight of about 5,000 to 50,000, a Tg of 10 to 80° C. and contain moieties, such as acetoacetate, aldimine, ketimine, mercaptan, hydroxyl, carboxyl, glycidyl and amino groups. Typically useful acrylic polymers are those known in the art and are polymers of two or more of the following: linear alkyl (meth)acrylates having 1 to 12 carbon atoms in the alkyl group, cyclic or branched alkyl (meth)acrylates having 3 to 12 carbon atoms in the alkyl group including isobornyl (meth)acrylate, hydroxy alkyl (meth)acrylates having 1 to 4 carbon atoms in the alkyl group, glycidyl (meth)acrylate, hydroxy amino alkyl (meth)acrylates having 1 to 4 carbon atoms in the alkyl group, and can contain styrene, alpha methyl styrene, vinyl toluene, (meth) acrylonitrile (meth)acryl amides, (meth)acrylic acid, (meaning both acrylic acid and methacrylic acid) trimethoxysilylpropyl (meth)acrylate and the like.

Preferred are hydroxy functional acrylic polymers having a hydroxy equivalent weight of 300 to 1300 and are polymers of hydroxy alkyl (meth)acrylates and one or more of the aforementioned monomers. One preferred hydroxy containing acrylic polymer contains 35 to 50% by weight styrene, 15 to 25% by weight ethylhexyl methacrylate and 15 to 20% by weight isobornyl methacrylate and 20 to 30% by weight hydroxyethyl methacrylate. A particularly preferred acrylic polymer contains 37% styrene, 20% by weight 2-ethylhexyl methacrylate and 17.5% by weight of isobornyl methacrylate and 25.5% by weight hydroxyethyl methacrylate.

Acrylic oligomers having a number average molecular weight of 300 to 3,000 of the aforementioned monomeric components also can be used as the optional polymeric component. By using monomers and reactants well known to those skilled in the art, these oligomers can have the one or more of the following groups that are reactive with isocyanate: hydroxyl, carboxyl, glycidyl, amine, aldimine, phosphoric acid and ketimine. Typically useful acrylic oligomers are disclosed in U.S. Ser. No. 10/617,585 filed Jul. 11, 2003

Publication No. U.S. 2004-001009 published on Jan. 15, 2004, which is hereby incorporated by reference.

Polyesters can also be used as the optional polymeric component, such as, hydroxyl or carboxyl terminated or hydroxyl or carboxyl containing polyesters. The following are typically useful polyesters or ester oligomers: polyesters or oligomers of caprolactone diol and cyclohexane dimethylol, polyesters or oligomers of tris-hydroxy ethylisocyanurate and caprolactone, polyesters or oligomers of trimethylol propane, phthalic acid or anhydride and ethylene oxide, polyesters or oligomers of pentaerythritol, hexahydrophthalic anhydride and ethylene oxide, polyesters or oligomers of pentaerythritol, hexahydrophthalic anhydride and butylene oxide, such as those shown in U.S. Pat. No. 6,221,494 B1 which is hereby incorporated by reference.

The aforementioned polyesters and oligomers can be reacted with an organic isocyanate to form urethane polymers and oligomers that can be used as the optional polymeric component in the novel composition.

One useful urethane oligomer that can used in the novel composition is formed by reacting an aliphatic polyisocyanate with an aliphatic or cycloaliphatic monohydric alcohol and subsequently reacting the resulting composition with a hydroxy functional aliphatic carboxylic acid until all of the isocyanate groups have been reacted. One useful polyurethane oligomer comprises the reaction product of the isocyanurate of hexane diisocyanate, cyclohexanol and dimethylol propionic acid. A water dispersible oligomer can be formed using conventional techniques know to those skilled in the art.

Optionally, an oligomeric component having a number average molecular weight of 300 to 3,000 having reactive groups that crosslink with an isocyanate, where the reactive groups are hydroxyl, carboxyl, glycidyl, amine, aldimines, phosphoric acid, ketimine and any mixtures thereof can be added to the novel composition.

Typically useful organic polyisocyanates crosslinking agents that can be used in the novel composition of this invention include aliphatic polyisocyanates, cycloaliphatic polyisocyanates and isocyanate adducts.

Examples of suitable aliphatic and cycloaliphatic polyisocyanates that can be used include the following: 4,4'dicyclohexyl methane diisocyanate, ("$H_{12}$MDI"), trans-cyclohexane-1,4-diisocyanate, 1,6-hexamethylene diisocyanate ("HDI"), isophorone isocyanate,("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2 cyclohexane diisocyanate, 1,4 cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets of hexamethylene diisocyanate, allophanates, trimers and biurets of isophorone diisocyanate and the isocyanurate of hexane diisocyanate.

Tri-functional isocyanates also can be used, such as, Desmodur® N 3300, trimer of hexamethylene diisocyanate, Desmodur® 3400, trimer of isophorone diisocyanate, Desmodur® 4470 trimer of isophorone diisocyanate, these trimers are sold by Bayer Corporation. A trimer of hexamethylene diisocyanate sold as Tolonate® HDT from Rhodia Corporation is also suitable.

An isocyanate functional adduct can be used, such as, an adduct of an aliphatic polyisocyanate and a polyol. Also, any of the aforementioned polyisocyanates can be used with a polyol to form an adduct. Polyols, such as, trimethylol alkanes, particularly, trimethylol propane or ethane can be used to form an adduct.

The novel composition can contain 1 to 30% by weight, based on the weight of the binder of acrylic NAD (non-aqueous dispersed) resins. These NAD resins typically are high molecular weight resins having a crosslinked acrylic core with a Tg between 20 to 100° C. and attached to the core are low Tg stabilizer segments. A description of such NADs is found in Antonelli et al. U.S. Pat. No. 4,591,533 and in Barsotti et al. U.S. Pat. No. 5,763,528 which patents are hereby incorporated by reference.

Optionally, a catalyst is used in the novel composition to reduce curing time and temperature and allow curing of the coating at ambient temperatures. Useful catalysts include alkyl carboxylic acids having 1 to 12 carbon atoms in the alkyl group, such as, acetic acid, formic acid, glycolic acid; aromatic acids, such as, benzoic acid; salicylic acid; and oligomers having pendant acid groups.

The coating composition optionally includes a catalytic amount of a catalyst for modifying the curing process. Generally, in the range of about 0.001 percent to about 5 percent, preferably in the range of from 0.005 percent to 2 percent, more preferably in the range of from 0.01 percent to 1 percent of the catalyst is utilized, all in weight percent based on the total weight of crosslinkable and crosslinking component solids. A wide variety of catalysts can be used, such as, tin compounds, including dibutyl tin dilaurate and dibutyl tin diacetate. These catalysts can be used alone or in conjunction with the carboxylic acids described above, such as, acetic acid. One of the commercially available catalysts, sold under the trademark, Fastcat® 4202 dibutyl tin dilaurate by Elf-Atochem North America, Inc. Philadelphia, Pa., is particularly suitable.

If used as a clear coat or mono-coat, the novel composition optionally contains about 0.1 to 5% by weight, based on the weight of the binder, of ultraviolet light absorbers. Typically useful ultraviolet light absorbers include hydroxyphenyl benzotriazols, such as, 2-(2-hydroxy-5-methylphenyl)-2H-benzotriazole, 2-(2-hydroxy-3,5-di-tert.amyl-phenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2,-hydroxy-3-dodecyloxy/tridecyloxypropyl)-oxy)-2-hydroxyphenyl]-4,6-bis(2,4-dimethylphenyl)-1,3,5-triazine, 2-[4(2-hydroxy-3-(2-ethylhexyl)-oxy)-2-hydroxyphenyl]-4,6-bis(2,4-dimethylphenyl)1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

If used as a clear coat or mono-coat, the novel composition optionally contains about 0.1 to 5% by weight, based on the weight of the binder, of a di-substituted phenol antioxidant or a hydroperoxide decomposer. Typically useful antioxidants include tetrakis[methylene(3,5-di-tert-butylhydroxyhydrocinnamate)]methane, octadecyl 3,5-di-tert-butyl-4-hydroxyhydrocinnamate, tris(2,4-di-tert-butylphenyl) phosphite, 1,3,5-tris(3,5-di-tert-butyl-4-hydroxybenzyl)-1,3,5-triazine-2,4,6(1H,3H,5H)-trione and benzenepropanoic acid, 3,5-bis(1,1-dimethyl-ethyl)-4-hydroxy-C7-C9 branched alkyl esters. Typically useful hydroperoxide decomposers include Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168, from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals and Doverphos® S-9228 from Dover Chemicals.

If used as a clear coat or mono-coat, the novel composition optionally contains about 0.1-5% by weight, based on the weight of the binder, of hindered amine light stabilizers. Typically useful hindered amine light stabilizers include N-(1,2,2,6,6-pentamethyl-4-piperidinyl)-2-dodecyl succinimide, N(1acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl)amino]-1,3,5-triazine-2-yl]imino]-3,1-propanediyl]]bis[N,N'''-dibutyl-N',N'''-bis(1,2,2,6,6-pentamethyl-4-piperidinyl)], poly-[[6-[1,1,3,3-tetramethylbutyl)-amino]-1,3,5-trianzine-2,4-diyl][2,2,6,6-tetramethylpiperidinyl)-imino]-1,6-hexane-diyl[(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxy-phenyl) methyl]butyl propanedioate, 8-acetyl-3-dodecyl-7,7,9,9,-tetramethyl-1,3,8-triazaspiro(4,5)decane-2,4-dion, dodecyl/tetradecyl-3-(2,2,4,4-tetramethyl-2l-oxo-7-oxa-3,20-diazal dispiro(5.1.11.2)henicosan-20-yl)propionate.

To form a coating composition that has a high level of weatherability and resistance to UV degradation, a combination of above described ultraviolet light absorbers, antioxidants and hindered amine light stabilizers can be used.

Typically, the composition is a solvent based composition and any of the known organic solvents may be used to form the coating composition. Typical solvents include aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate; and mixtures of any of the above.

The novel coating composition may also include other conventional formulation additives, such as, wetting agents, leveling and flow control agents, for example, Resiflow®S (polybutylacrylate), BYK® 320 and 325 (high molecular weight polyacrylates), BYK® 347 (polyether-modified siloxane), rheology control agents, such as, fumed silica, defoamers, surfactants and emulsifiers to help stabilize the composition. Other additives that tend to improve mar resistance can be added, such as, silsesquioxanes and other silicate-based micro-particles.

The coating composition of this invention can be used as a clear coat that is applied over a pigmented base coat that may be a pigmented version of the composition of this invention or another type of a pigmented base coat. The clear coating can be in solution or in dispersion form.

Typically, a clear coating is then applied over the base coating before the base coating is fully cured, a so called "wet-on-wet process", and the base coating and clear coating are then fully cured at ambient temperatures or can be cured by heating to elevated temperatures of 40° C. to 170° C. for 15 to 45 minutes. If used in refinishing vehicles, the base coat may be allowed to "dry to the touch" at ambient temperature conditions or under warm air before the clear coating is applied. The base coating and clear coating preferably have a dry coating thickness ranging from 25 to 75 microns and 25 to 100 microns, respectively. Also, the composition can be used as a matte clear coating composition typically applied to the interior of automobiles and trucks.

The novel coating composition may be used as a base coat or as a pigmented monocoat topcoat. Both of these compositions require the presence of pigments. Typically, a pigment-to-binder ratio of 0.1/100 to 200/100 is used depending on the color and type of pigment used. The pigments are formulated into mill bases by conventional procedures, such as, grinding, sand milling, and high speed mixing. Generally, the mill base comprises pigment and a binder or a dispersant or both in a solventborne or aqueous medium. The mill base is added in an appropriate amount to the coating composition with mixing to form a pigmented coating composition.

Any of the conventionally-used organic and inorganic pigments, such as, white pigments, like, titanium dioxide, color pigments, metallic flakes, such as, aluminum flake, special effects pigments, such as, coated mica flakes, coated aluminum flakes and the like and extender pigments can be used. It may be desirable to add flow control additives.

The novel coating composition may be used as a primer or a sealer in which case typical pigments used in primers would be added, such as, carbon black, barytes, silica, iron oxide and other pigments that are commonly used in primers in a pigment-to-binder ratio of 10/100 to 300/100. These primers and sealers exhibit exceptional adhesion to untreated bare metal substrates, such as, aluminum and steel substrates, and to treated metal substrates, such as galvanized steel, and provide excellent stone chip resistance.

The coating composition can be applied by conventional techniques, such as, spraying, electrostatic spraying, dipping, brushing, and flow coating.

The coating composition is particularly useful for the repair and refinish of automobile bodies and truck bodies and parts as a clear coat, pigmented base coat, mono-coat as a primer, sealer or primer surfacer.

The novel composition has also uses as binder for rapid cure chip coats. The novel composition of this invention can be combined with the isocyanate reagents described above directly without the use of a solvent or additional components and applied to an automobile body directly using application methods known in the art such as integrated multi-component applicators, spray guns or similar devices. Optionally, the combination of the composition of this invention including the typical isocyanate component under simple agitation forms a mass with a desired viscosity profile for direct application to a surface, e.g., a putty, using spatulas or other manual application devices, such as a squeegee.

The novel composition has uses for coating any and all items manufactured and painted by automobile sub-suppliers, frame rails, commercial trucks and truck bodies, including but not limited to beverage bottles, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, large commercial aircraft and small pleasure aircraft, pleasure vehicles, such as, snow mobiles, all terrain vehicles, personal watercraft, motorcycles, and boats. The novel composition also can be used as a coating for industrial and commercial new construction and maintenance thereof; cement and wood floors; walls of commercial and residential structures, such as, office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signs; fiberglass structures; sporting goods; and sporting equipment.

The following are testing procedures used in the Examples:

Cotton Tack Free Time

Allow coated panel to dry for set period of time (e.g. 30 minutes). Drop a cotton ball from a height of 1 inch onto the surface of the panel and leave the cotton ball on the surface for a set time interval and invert panel. Repeat above until the time the cotton ball drops off the panel on inversion and note that as the cotton tack free time.

MEK Rubs

A coated panel is rubbed (100 times) with an MEK (methyl ethyl ketone) soaked cloth using a rubbing machine and any excess MEK is wiped off. The panel is rated from 1-10. Rating 10—no visible damage to the coating, rating 9—1-3 distinct scratches, rating 8—4-6 distinct scratches, rating 7—7-10 distinct scratches, rating 6—10-15 distinct scratches with slight pitting or slight loss of color, rating 5—15-20 distinct scratches with slight to moderate pitting or moderate loss of color, rating 4—scratches start to blend into one another, rating 3—only a few undamaged areas between blended scratches, rating 2—no visible signs of undamaged paint, rating 1 complete failure—bare spots are shown. The final rating is obtained by multiplying the number of rubs by the rating.

Water Spot Test

Water spot rating is a measure of how well the film is crosslinked early in the curing of the film. If water spot damage is formed on the film, this is an indication that the cure is not complete and further curing of the film is needed before the film can be wet sanded or buffed or moved from the spray both. The water spot rating is determined in the following manner.

Coated panels are laid on a flat surface and deionized water was applied with a pipette at 1 hour-timed intervals. A drop about ½ inch in diameter was placed on the panel and allowed to evaporate. The spot on the panel was checked for deformation and discoloration. The panel was wiped lightly with cheesecloth wetted with deionized water, which was followed by lightly wiping the panel dry with the cloth. The panel was then rated on a scale of 1 to 10. Rating of 10 best—no evidence of spotting or distortion of discoloration, rating 9—barely detectable, rating 8—slight ring, rating 7—very slight discoloration or slight distortion, rating 6—slight loss of gloss or slight discoloration, rating 5—definite loss of gloss or discoloration, rating of 4—slight etching or definite distortion, rating of 3—light lifting, bad etching or discoloration, rating of 2—definite lifting and rating of 1—dissolving of the film.

BK Dry Time

Surface drying times of coated panels measured according to ASTM D5895.

Swell Ratio

The swell ratio of a free film (removed from a sheet of TPO—thermoplastic olefin) was determined by swelling the film in methylene chloride. The free film was placed between two layers of aluminum foil and using a LADD punch, a disc of about 3.5 mm in diameter was punched out of the film and the foil was removed from the film. The diameter of the unswollen film ($D_o$) was measured using a microscope with a 10× magnification and a filar lens. Four drops of methylene chloride were added to the film and the film was allowed to swell for a few second and then a glass slide was placed over the film and the swollen film diameter ($D_s$) was measured. The swell ratio was then calculated as follow:

$$\text{Swell Ratio} = (D_s)^2/(D_o)^2$$

Persoz Hardness Test

The change in film hardness of the coating was measured with respect to time by using a Persoz hardness tester Model No. 5854 (ASTM D4366), supplied by Byk-Mallinckrodt, Wallingford, Conn. The number of oscillations (referred to as Persoz number) were recorded.

Hardness (Fischer)

Hardness was measured using a Fischerscope® hardness tester (the measurement is in Newtons per square millimeter).

Gel Fraction

Measured according to the procedure set forth in U.S. Pat. No. 6,221,494 col. 8 line 56 to col. 9 line 2 which procedure is hereby incorporated by reference.

Time to Gel

The time in minutes it takes for a liquid coating to gel.

Direct to Metal Adhesion Test

Adhesion of a coating to bare metal substrates was determined according to ASTM D3359-02, the standard test method for measuring adhesion by tape test.

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth herein below, but rather is defined by the claims contained herein below.

In the following examples, all parts and percentages are on a weight basis unless otherwise indicated.

EXAMPLES

The following were used in the examples:

Desmodur® 3300-trimer of hexamethylene diisocyanate from Bayer Corporation.

LC/MS (Liquid Chromatography/Mass Spectroscopy) analyses were performed on a Waters Alliance 2790 LC quipped with a MS (ES) interface. Column: Zorbax SB-C18, 2.1×150 mm at 50° C.; Solvents: A=99:1 water/acetonitrile, B=acetonitrile, C=methanol, D=80:20 acetonitrile/water; Conditions: 90% A/10% B/0.25% D to 0% A/100% B/0.25% D over 30 min, hold ten minutes, then return to initial conditions after 42 min; Wavelength: 191-799 nm; Flow rate: 0.25 mL/min.

Example 1

Synthesis of Compound (XII—Described Above)

To a four-necked 2 L round bottom flask fitted with overhead stirrer, thermocouple, condenser and addition funnel was added under nitrogen atmosphere 192.3 g dicyclohexylmaleate (0.686 mol) (maleic acid dicyclohexylester) and 800 mL of dry acetonitrile, resulting in a white slurry. 57.7 g of diamine (corresponding to structure IV—described above) (0.343 mol) was slowly added via the addition funnel. The reaction mixture was then heated to 60° C. and stirred at that temperature for two weeks, while the progress of the reaction was monitored by GC (disappearance of starting materials) and LC/MS analysis. After cooling to room temperature, the reaction mixture was filtered through a medium filter-frit and the solvent was removed from the filtrate by rotary evaporation, and the residual pale yellow oil was dried in vacuo. 249.7 g of the desired product compound (XII) were isolated.

LC/MS analysis: 11.5 min, 11.9 min (3.9%, 1.2%, total amount=5.1%), M+H=449.5, mono-addition product); 23.2 min, 23.5 min, 25.2 min, 25.6 min, 26.0 min 26.4 min, 29.5 min, 30.1 min, 30.4 min (20.1%, 28.7%, 8.7%, 10.2%, 7.8%, 7.2%, 7.8%, 1.8%, 2.1%, total amount=94.4%, M+H=729.5).

Example 2

Synthesis of (XVI—Described Above)

To a four-necked 500 mL round bottom flask fitted with magnetic stirrer, thermocouple, condenser and addition funnel was added under nitrogen atmosphere 85.0 g (0.505 mol) of diamine (corresponding to structure IV—described above). Then 230.6 g (1.010 mol) di-secbutyl maleate was slowly added via the addition funnel, while the temperature was maintained at <30° C. with an ice-water-bath. The reaction mixture was then heated to 70° C. for eight days while the progress of the reaction was monitored by GC (disappearance of starting materials) and LC analysis. After cooling to room temperature, the reaction mixture was filtered through a plug of celite to yield 294.1 g of the desired product as a colorless oil.

LC/MS analysis: 9.0 min, 9.3 min (2.1%, 1.3%, total amount=3.4%, M+H=397.4, mono-addition product); 17.4 min, 18.3 min, 18.8 min, 19.2 min, 19.5 min, 22.6 min, 23.0 min (48.7%, 0.8%, 10.2%, 17.5%, 8.6%, 7.0%, 3.3%, total amount=96.1%, M+H=625.4, di-addition product).

Example 3

Synthesis of (XX—Described Above))

To a four-necked 250 mL round bottom flask fitted with magnetic stirrer, thermocouple, condenser and addition funnel was added under nitrogen atmosphere 37.3 g (0.159 mol) of diamine (corresponding to structure X—described above). Then 72.7 g (0.318 mol) di-secbutyl maleate was slowly added via the addition funnel, while the temperature was maintained at <15° C. with an ice-water-bath. The reaction mixture was then heated to 50-60° C. for about two weeks, while the progress of the reaction was monitored by LC analysis. After cooling to room temperature, 85.0 g of colorless oil was isolated after solvent removal and filtration through celite.

LC/MS analysis: 19.4 min, 20.9 min (both M+H=691.5, exclusively (XX)).

Example 4

Synthesis of (XVIII—Described Above)

To a four-necked 1 L round bottom flask fitted with overhead stirrer, thermocouple, condenser and addition funnel was added under nitrogen atmosphere 77.6 g dicyclohexylmaleate (0.277 mol) (maleic acid dicyclohexylester) and 350 mL of dry acetonitrile, resulting in a white slurry. 32.4 g of diamine (corresponding to structure X described above) (0.138 mol) was slowly added via the addition funnel, which was then rinsed with a few mL of acetonitrile. The reaction mixture was then heated to 60° C. and stirred at that temperature for two weeks, while the progress of the reaction was monitored by GC (disappearance of starting materials) and LC/MS analysis. After cooling to room temperature and solvent removal, 78.5 g of colorless oil was isolated after workup, solvent removal and filtration through celite.

LC/MS analysis: 25.2 min, 25.6 min, 26.3 min, 27.0 min, 27.3 min, 27.8 min, 29.1 min, 29.9 min (all M+H=795.5, exclusively (XVIII)).

Example 5

Synthesis of (XXIV—Described Above)

Diamine (corresponding to structure IV—described above) (14.3 g, 0.085 mol) and 20 g ethyl acetate were added into a 250 ml flask under an $N_2$ atmosphere. The dicyclohexyl maleate, dissolved in 80 g ethyl acetate, was added dropwise to the diamine under agitation. The reaction was maintained stirring at 0° C. for 4 hrs followed by continued stirring at ambient temperature under $N_2$ for 18 hrs. Analysis by GC-MS indicated complete conversion of the dicyclohexyl maleate. Next, diethyl maleate (15.32 g) was added dropwise to the reaction mixture while maintaining 0° C. The reaction mixture was heated at 40° C. for 22 hrs. Analysis by GC indicates complete conversion of the diamine. After solvent removal in vacuo a viscous liquid (53.6 g) was isolated. Compound (XXIV) was analyzed by LC/MS, the reaction mixture contains (XXIV) with 45.3%, (XII) with 44.8% and (XIII) with 5.4%.

Example 6

Synthesis of (XXII—Described Above)

Diamine (corresponding to structure III—described above) (1.82 g) and diethyl maleate (3.44 g), were mixed in a 20 ml flask under agitation. The reaction was maintained at ambient temperature under $N_2$ for 18 hrs. Analysis by GC-MS indicated complete conversion of diamine (III). The product compound (XXII) was used as such.

Coating Evaluation Example Series 1

Gel test: 1 equivalent diamine nucleophile, ca. 1.05 eq. Desmodur® 3300, and the required amount of butyl acetate to produce an 80 wt. % solution were combined in a vial at room temperature and mixed well. About 1 mL were then applied to a glass panel, and the drytime was measured with a BK drytime recorder. The time to gel was determined by visual inspection as the point at which the reaction mixture was completely gelled.

| Example | Time to gel | BK Stage 3 | BK Stage 4 |
|---|---|---|---|
| (XII) | 2 h | 130 min | 150 min |
| (XVI) | 2 h | 105 min, (fine surface trace) | >6 h |
| (XX) | 4 h 50 min | 120 min | 180 min |
| (XVIII) | 60 min | 120 min | 180 min |

Coating Evaluation Example Series 2

| EXAMPLE | 2A | 2B |
|---|---|---|
| Portion 1 | | |
| Isocyanate reactive compound - XXIV | 30.78 | 0 |
| Isocyanate reactive compound - XII | 0 | 36.14 |
| Butyl Acetate | 21.04 | 23.27 |
| Flow Additive* | 0.5 | 0.56 |
| Portion 2 | | |
| Tolonate ® HDT** | 19.47 | 19.47 |

| EXAMPLE | 2C | 2D |
|---|---|---|
| Portion 1 | | |
| Isocyanate reactive compound - XVI | 30.94 | 0 |
| Isocyanate reactive compound - XX | 0 | 30 |
| Butyl Acetate | 21.1 | 9.77 |
| Flow Additive* | 0.5 | 0.37 |
| Portion 2 | | |
| Tolonate ® HDT** | 19.47 | 13.66 |

*20% BYK 301 ® flow additive, supplied by BYK-CHEMIE, in Propylene glycol monomethyl ether acetate
**Tolonate ® HDT- Isocyanurate trimer of hexamethylene diisocyanate supplied by RHODIA INC.

For each of the Examples 2A-2D, the constituents of Portion 1 were charged into a mixing vessel in the order shown above and mixed then Portion 2 was charged into the mixing vessel and thoroughly mixed with Portion 1. Each of the coating compositions was applied with a doctor blade over a separate phosphated cold roll steel panel primed with a layer of PowerCron® Primer supplied by PPG, Pittsburgh, Pa., to a dry coating thickness of about 50 micrometers and air dried at ambient temperature conditions. Then the panels were tested using the test set forth in following table and the results of the test are shown in the attached table.

| | Ex. 2A | Ex. 2B | Ex. 2C x. | Ex. 2D |
|---|---|---|---|---|
| Isocyanate reactive component | XXIV | XII | XVI | XX |
| Theoretical Eq Wt | 310 | 364 | 312 | 345 |
| Calculated Weight solids | 70% | 70% | 70% | 70% |
| Time to gel (min) | 59 | 125 | 125 | 155 |
| BK 3 time (min) | 33.1 | 82.6 | 120 | 116 |
| BK 4 time (min) | 375 | 331 | 234 | 383 |
| Cotton tack free time (min) | 99 | 195 | 145 | 200 |
| Water spot - 4 hrs @ RT | 8 | 9 | 8 | 9 |
| MEK rubs - 4 hrs @ RT | 600 | 500 | 400 | 500 |
| Swell ratio - 1 day @ RT | 2.27 | 2.13 | 2.33 | 2.41 |
| Swell ratio - 30 days @ RT | 2.03 | 2.02 | 2.16 | 2.29 |
| Persoz hardness - 4 hrs @ RT | 46 | 42 | 56 | 55 |

| | Ex. 2A | Ex. 2B | Ex. 2C x. | Ex. 2D |
|---|---|---|---|---|
| Fischer Hardness - 1 day @ RT | 39 | 43.5 | 73 | 77 |
| Fischer Hardness - 30 days @ RT | 122 | 113 | 114 | 111 |
| gel fraction - 30 days @ RT | 91.79 | 88.53 | 94.27 | 94.6 |

Eq Wt - equivalent weight
Min - minutes
RT - room temperature

These results show that coatings made from the isocyanate-reactive components of this invention have excellent early cure, as is evident from the short BK dry times, excellent early water spot, and good MEK rubs at 4 hours and remain fluid for a useful period of time. The films also have excellent final properties such as hardness and gel fraction.

Evaluation Example Series 3

Evaluation as Rapid Cure Putty: The reactive isocyanate compound was combined with Desmodur® 3300 directly in a 30 mm vial and stirred for exactly 90 seconds vigorously with a glass rod. The glass rod was used to smear this paste onto a 4×6 inch aluminum panel. The time to gel and the cotton tack free time were measured and are shown in the following table.

| Example 3 | A | B | C | D |
|---|---|---|---|---|
| Isocyanate reactive compound XVI | 9.23 | 0 | 0 | 0 |
| Isocyanate reactive compound XII | 0 | 8.91 | 0 | 0 |
| Isocyanate reactive compound XVIII | 0 | 0 | 10.06 | 0 |
| Isocyanate reactive compound XX | 0 | 0 | 0 | 9.58 |
| Desmodur ® 3300 | 5.76 | 6.08 | 4.93 | 5.41 |
| Activation Time (min) | 7.52 | 10.09 | 7.28 | 12.23 |
| Time to gel (min) | 13 | 2 | 12 | 31 |
| Cotton Tack Free Time (min) | 21 | 6 | 30 | 97 |
| Texture of surface | Smooth | Rough | Smooth | Smooth |

The above data indicates that reactive putties can be made from the isocyanate reactive compound and polyisocyanate that can be useful in repairing damaged substrates.

Comparative Coating Examples Series 4

The novel coating compositions of this invention were evaluated in comparison to coating compositions described in the prior art.

Compound (L) was described in U.S. Pat. No. 5,126,170; compound (LI) was described in EP 0939091.

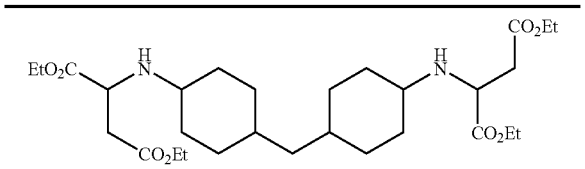

| Gel Time | (Minutes): |
|---|---|
| (L) | 83 |
| (LI) | gelled (too fast to apply) |
| (XIII) | 47 |
| (XXV) | 82 |
| Viscosity (measure using Brookfield analysis) | |
| (L) | 1000 cp |
| (LI) | 257 cp |
| (XIII) | 451 cp |

These viscosity measurements show the much lower viscosity of some of the bicyclic aspartic diamines in comparison to the viscosity of compound (L) (Desmophen® NH-1420 by Bayer). The high viscosity of Desmophen® NH-1420 requires the use of low viscosity, reactive diluents, such as ketimines, for the formulation of true 2.1 VOC systems. Because of their surprisingly low viscosity, bicyclic aspartic diamines could be formulated without the addition of reactive diluents.

In addition, while compound (LI) leads to immediate gelation when mixed with a isocyanate, compound (XIII) of this invention with only one additional methyl substituent relative to (LI) has a gel time of almost fifty minutes while retaining low viscosity.

Comparative Coating Examples Series 5
(Direct-to-Metal Adhesion)

In the following Example, the reactive isocyanate compound XX was combined with Desmodur® 3300 at 70% weight in butyl acetate in a 30 mm vial and vortexed for 20 seconds. The coating composition was applied with a doctor blade (5 mil film) over A) clean, unpolished aluminum, B) clean, unpolished cold roll steel, and C) clean, unpolished galvanized steel. The adhesion of the coating film was measured according to the aforementioned "X-hatch" tape test after 1 day, 3 days and seven days. The results are summarized in the attached table, showing excellent adhesion (10=highest rating) for cold roll steel and galvanized steel, and has adhesion to aluminum.

| | | Compound XX | | | | |
|---|---|---|---|---|---|---|
| Day 1 Plates | Tape used | Rating | Day 3 Plates | Rating | Day 7 Plates | Rating |
| A | 898 | 5 | A | 5 | A | 5 |
| B | 898 | 10 | B | 10 | B | 10 |
| C | 898 | 10 | C | 10 | C | 10 |

The invention claimed is:

1. A process for coating an auto body or auto part which comprises applying a base coating of a pigmented coating composition to a substrate;

applying a top-coating of a clear coating over the base coating; and curing the base coating and top-coating to form a base coat/ clear coat finish on the substrate, wherein wherein the improvement comprises using as the clear top-coating, a clear coat composition which comprises a binder consisting essentially of a. polyisocyanate crosslinking agent;

b. an isocyanate-reactive component having at least one compound having the following formula:

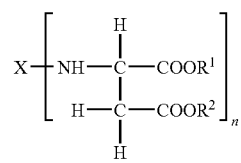

wherein n on average is 1.7 to 2 and X is a cycloaliphatic norbornane derivative of formula (II)

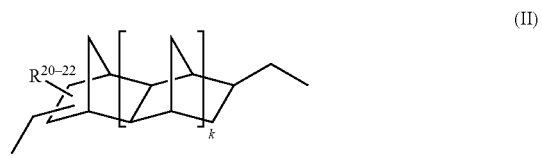

(II)

or a mixture of isomers thereof;

k =0, 1 or 2 and the bridging $CH_2$ group may be on the same or opposite side with respect the first bridging $CH_2$ group, $R^{20}$, $R^{21}$, $R^{22}$, can be the same or different and are each independently H, a $C_1$ to $C_{20}$ alkyl group, a $C_1$ to $C_{20}$ alkyl group substituted with a hydroxyl group, a $C_1$ to $C_{18}$ perfluoroalkyl group, a phenyl group, a $C_6$ to $C_{20}$ aryl group substituted with a $C_1$ to $C_{12}$ alkyl group, a $C_6$ to $C_{20}$ aryl group substituted with a hydroxyl group, a $C(O)OR^{29}$ group (with $R^{29}$ selected to be a $C_1$ to $C_{20}$ linear or branched or cyclic alkyl group or a $C_6$ to $C_{20}$ aryl group), with the proviso that $R^{20}$, $R^{21}$ and $R^{22}$ can not all be H; and $R^1$ and $R^2$ are the same or different organic groups that are inert to isocyanate groups and each are from the group of C2-C4 alkyl groups, or $C_6$-$C_{18}$ linear or branched alkyl groups.

2. An auto body or auto part coated with a dried cured base coat/clear coat finish produced by the process of claim 1.

* * * * *

UNITED STATES PATENT AND TRADEMARK OFFICE
CERTIFICATE OF CORRECTION

PATENT NO. : 7,608,303 B2 Page 1 of 1
APPLICATION NO. : 11/303080
DATED : October 27, 2009
INVENTOR(S) : Lenges et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this

Twelfth Day of October, 2010

David J. Kappos
*Director of the United States Patent and Trademark Office*